United States Patent
Vajapeyam et al.

(10) Patent No.: US 11,683,837 B2
(45) Date of Patent: Jun. 20, 2023

(54) RANDOM ACCESS PROCEDURE AND BROADCAST PRIORITIZATION FOR MACHINE TYPE COMMUNICATIONS (MTC)

(71) Applicant: QUALCOMM Incorporated, San Diego, CA (US)

(72) Inventors: Madhavan Srinivasan Vajapeyam, San Diego, CA (US); Hao Xu, Beijing (CN); Peter Gaal, San Diego, CA (US); Wanshi Chen, San Diego, CA (US); Alberto Rico Alvarino, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/703,438

(22) Filed: Dec. 4, 2019

(65) Prior Publication Data
US 2020/0112997 A1   Apr. 9, 2020

Related U.S. Application Data

(63) Continuation of application No. 15/009,804, filed on Jan. 28, 2016, now Pat. No. 10,555,345.
(Continued)

(51) Int. Cl.
H04W 74/08   (2009.01)
H04W 4/70   (2018.01)
(Continued)

(52) U.S. Cl.
CPC ......... *H04W 74/0833* (2013.01); *H04L 67/12* (2013.01); *H04L 67/56* (2022.05);
(Continued)

(58) Field of Classification Search
CPC ..... H04W 4/70; H04W 52/281; H04W 67/12; H04W 67/28; H04W 74/008; H04W 74/0833
See application file for complete search history.

(56) References Cited

U.S. PATENT DOCUMENTS 8,077,638 B2   12/2011   Li et al.
8,295,243 B2   10/2012   Malladi et al.
(Continued)

FOREIGN PATENT DOCUMENTS

CN   104184548 A   12/2014
JP   2012530434 A   11/2012
(Continued)

OTHER PUBLICATIONS

Alcatel-Lucent., et al., "PSS/SSS, PBCH and PRACH Operation Under Power Consumption Reduction", 3GPP Draft; R1-144699—REL-13 MTC—PSS, SSS, PBCH & PRACH V02, 3rd Generation Partnership Project (3GPP), Mobile Competence Centre; 650, Route Des Lucioles; F-06921 Sophia-Antipolis Cedex; France, vol. RAN WG1, No. San Francisco, USA; Nov. 17, 2014-Nov. 21, 2014, Nov. 17, 2014 (Nov. 17, 2014), XP050875782, 8 Pages, Retrieved from the Internet: URL: http://www.3gpp.org/ftp/Meetings_3GPP_SYNC/RAN1/Docs/ [retrieved on Nov. 17, 2014].
(Continued)

*Primary Examiner* — Brian P Cox

(57) ABSTRACT

Certain aspects of the present disclosure generally relate to wireless communications, and more specifically to random access procedures and/or prioritization of broadcast transmissions in machine type communications (MTC) devices and enhanced MTC (eMTC). An example method generally includes determining a plurality of subframes in which the UE may transmit a bundled random access channel (RACH) message to a base station (BS), determining, within the subframes, at least one narrowband region for transmitting
(Continued)

the bundled RACH message, determining a bundling size for the bundled RACH message, the bundling size indicating a number of the plurality of subframes in which the bundled RACH message is transmitted, and transmitting the bundled RACH message in the narrowband region of the plurality of subframes, based at least in part on the determined bundling size.

40 Claims, 8 Drawing Sheets

Related U.S. Application Data

(60) Provisional application No. 62/165,823, filed on May 22, 2015, provisional application No. 62/110,164, filed on Jan. 30, 2015.

(51) Int. Cl.
*H04L 67/12* (2022.01)
*H04L 67/56* (2022.01)
*H04W 52/28* (2009.01)
*H04W 74/00* (2009.01)

(52) U.S. Cl.
CPC ........... *H04W 4/70* (2018.02); *H04W 52/281* (2013.01); *H04W 74/008* (2013.01)

(56) References Cited

U.S. PATENT DOCUMENTS

| | | | | |
|---|---|---|---|---|
| 8,611,297 | B2* | 12/2013 | Noh | H04W 74/08 370/329 |
| 8,989,121 | B2 | 3/2015 | Luo et al. | |
| 2009/0088148 | A1* | 4/2009 | Chung | H04W 48/16 455/423 |
| 2010/0034126 | A1 | 2/2010 | Kitazoe et al. | |
| 2010/0040001 | A1* | 2/2010 | Montojo | H04W 72/04 370/329 |
| 2010/0067412 | A1 | 3/2010 | Kitazoe et al. | |
| 2013/0083749 | A1* | 4/2013 | Xu | H04W 74/0833 370/328 |
| 2013/0083753 | A1 | 4/2013 | Lee et al. | |
| 2013/0230016 | A1 | 9/2013 | Lindoff et al. | |
| 2013/0242824 | A1 | 9/2013 | Lee et al. | |
| 2013/0301587 | A1 | 11/2013 | Luo et al. | |
| 2014/0016534 | A1 | 1/2014 | Kim et al. | |
| 2014/0133331 | A1 | 5/2014 | Fu et al. | |
| 2014/0198664 | A1 | 7/2014 | Chen et al. | |
| 2014/0226638 | A1 | 8/2014 | Xu et al. | |
| 2014/0241261 | A1 | 8/2014 | Ratasuk et al. | |
| 2014/0286240 | A1 | 9/2014 | Kim et al. | |
| 2014/0313999 | A1* | 10/2014 | Xu | H04W 74/0833 370/329 |
| 2015/0016312 | A1 | 1/2015 | Li et al. | |
| 2015/0039958 | A1 | 2/2015 | Vos | |
| 2015/0103761 | A1* | 4/2015 | Chen | H04W 74/0833 370/329 |
| 2015/0208440 | A1 | 7/2015 | Agiwal et al. | |
| 2016/0227580 | A1* | 8/2016 | Xiong | H04W 28/08 |
| 2016/0227582 | A1 | 8/2016 | Vajapeyam et al. | |
| 2016/0278127 | A1* | 9/2016 | Sunell | H04W 74/0833 |
| 2016/0353440 | A1* | 12/2016 | Lee | H04W 72/0453 |

FOREIGN PATENT DOCUMENTS

| | | |
|---|---|---|
| JP | 2016528791 A | 9/2016 |
| KR | 20140019405 A | 2/2014 |
| WO | 2008024788 A2 | 2/2008 |
| WO | 2009157962 A1 | 12/2009 |
| WO | 2010017490 | 2/2010 |
| WO | WO-2013066935 A1 | 5/2013 |
| WO | 2014165757 A2 | 10/2014 |
| WO | 2014172528 A1 | 10/2014 |
| WO | 2015005701 A1 | 1/2015 |

OTHER PUBLICATIONS

CATT: "PRACH Coverage Enhancement", 3GPP Draft; R1-144623, 3rd Generation Partnership Project (3GPP), Mobile Competence Centre; 650, Route Des Lucioles; F-06921 Sophia-Antipolis Cedex; France, vol. RAN WG1, No. San Francisco, USA; Nov. 17, 2014-Nov. 21, 2014, Nov. 17, 2014 (Nov. 17, 2014), XP050875710, 5 Pages, Retrieved from the Internet: URL: http://www.3gpp.org/ftp/Meetings_3GPP_SYNC/RAN1/Docs/ [retrieved on Nov. 17, 2014].
International Search Report and Written Opinion—PCT/US2016/015523—ISA/EPO—dated Jul. 1, 2016.
Qualcomm Incorporated: "RACH Channel Design for MTC Coverage Enhancements", 3GPP Draft, R1-140447, 3rd Generation Partnership Project (3GPP), Mobile Competence Centre, 650, Route Des Lucioles, F-06921 Sophia-Antipolis Cedex, vol. RAN WG1, No. Prague, Czech Republic, Feb. 10, 2014-Feb. 14, 2014, Feb. 9, 2014 (Feb. 9, 2014), 5 Pages, XP050735983. Retrieved from the Internet: URL: http://www.3gpp.org/ftp/Meetings_3GPP_SYNC/RAN/RAN1/Docs/ [retrieved on Feb. 9, 2014].
Taiwan Search Report—TW105102912—TIPO—dated Oct. 15, 2019.
Taiwan Search Report—TW109101675—TIPO—dated Mar. 12, 2020.
European Search Report—EP21194423—Search Authority—The Hague—dated Sep. 21, 2021.

\* cited by examiner

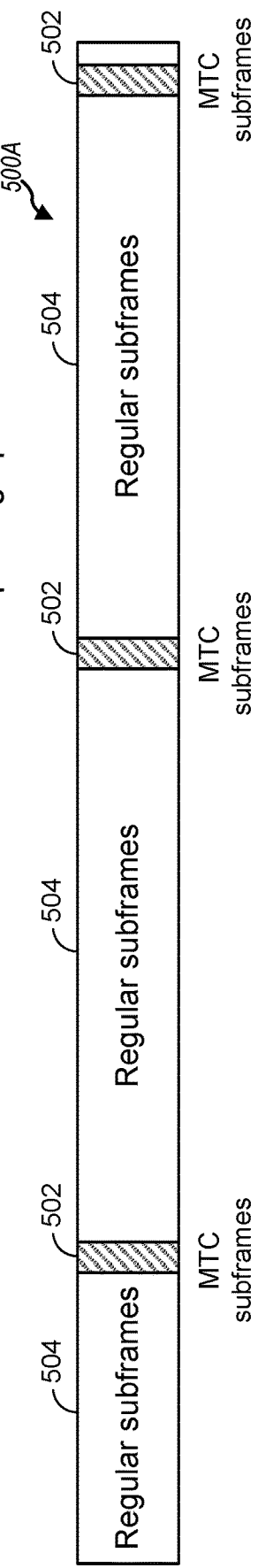
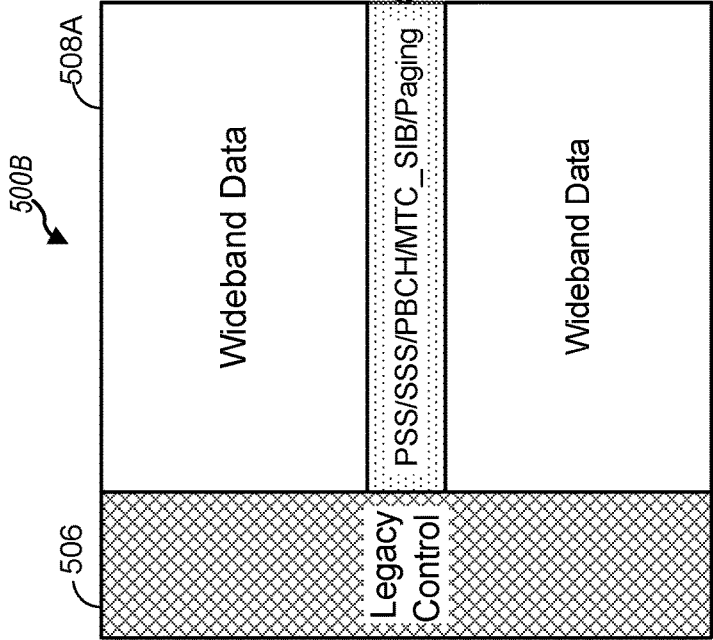
FIG. 5A
FIG. 5B

RANDOM ACCESS PROCEDURE AND BROADCAST PRIORITIZATION FOR MACHINE TYPE COMMUNICATIONS (MTC)

CROSS-REFERENCE TO RELATED APPLICATION(S)

This application is a continuation of U.S. patent application Ser. No. 15/009,804, filed Jan. 28, 2016, which claims the benefit of U.S. Provisional application Ser. No. 62/110,164, filed Jan. 30, 2015, and U.S. Provisional application Ser. No. 62/165,823, filed May 22, 2015, all of which are assigned to the assignee hereof and hereby expressly incorporated by reference herein.

BACKGROUND

I. Field of the Invention

Certain aspects of the present disclosure generally relate to wireless communications, and more specifically to random access procedures and/or prioritization of broadcast transmissions in machine type communication(s) (MTC) and enhanced or evolved MTC (eMTC).

II. Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some UEs may be considered machine-type communication (MTC) UEs, which may include remote devices, that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques and apparatus are provided herein for random access procedures and/or prioritization of broadcast transmissions in MTC and enhanced MTC (eMTC). MTC/eMTC devices include devices such as sensors, meters, monitors, location tags, drones, trackers, robots/robotic devices, etc. MTC/eMTC devices may be implemented as internet of everything (IoE) devices or internet of things (IoT) devices (e.g., narrowband IoT (NB-IoT) devices). To enhance coverage of certain devices, such as MTC devices, "bundling" may be utilized in which certain transmissions are sent as a bundle of transmissions, for example, with the same information transmitted over multiple subframes. Certain aspects of the present disclosure relate to determining resources and/or bundling size for messages exchanged during random access procedures.

Certain aspects of the present disclosure provide a method for wireless communications by a user equipment (UE). The method generally includes determining a plurality of subframes in which the UE may transmit a bundled random access channel (RACH) message to a base station (BS), determining, within the subframes, at least one narrowband region for transmitting the RACH message, and determining a bundling size for the RACH message. The bundling size indicates a number of the plurality of subframes in which the RACH message is transmitted. The method also includes transmitting the RACH message in the narrowband region of the plurality of subframes, based at least in part on the determined bundling size.

Certain aspects of the present disclosure provide an apparatus for wireless communications. The apparatus generally includes means for determining a plurality of subframes in which the apparatus may transmit a bundled RACH message to a BS, means for determining, within the subframes, at least one narrowband region for transmitting the RACH message, and means for determining a bundling size for the RACH message. The bundling size indicates a number of the plurality of subframes in which the RACH message is transmitted. The apparatus also includes means for transmitting the RACH message in the narrowband region of the plurality of subframes, based at least in part on the determined bundling size.

Certain aspects of the present disclosure provide an apparatus for wireless communications. The apparatus generally includes at least one processor configured to determine a plurality of subframes in which the apparatus may transmit a bundled RACH message to a BS, determine, within the subframes, at least one narrowband region for transmitting the RACH message, and determine a bundling size for the RACH message. The bundling size indicates a number of the plurality of subframes in which the RACH message is transmitted. The apparatus may also include a transmitter configured to transmit the RACH message in the narrowband region of the plurality of subframes, based at least in part on the determined bundling size. The apparatus may further include a memory coupled with the at least one processor.

Certain aspects of the present disclosure provide a computer-readable medium having computer executable code stored thereon. The computer executable code generally includes code for determining a plurality of subframes in which a UE may transmit a bundled RACH message to a BS, determining, within the subframes, at least one narrowband region for transmitting the RACH message, and determining a bundling size for the RACH message. The bundling size indicates a number of the plurality of subframes in which the RACH message is transmitted. The computer executable code also includes code for transmitting the RACH message in the narrowband region of the plurality of subframes, based at least in part on the determined bundling size.

Certain aspects of the present disclosure provide a method for wireless communications by a BS. The method generally includes determining a plurality of subframes in which a UE may transmit a bundled RACH message to the BS, determining, within the subframes, at least one narrowband region for receiving the RACH message, and determining a bundling size for the RACH message. The bundling size indicates a number of the plurality of subframes in which the RACH message is transmitted by the UE. The method also includes receiving the RACH message in the narrowband region of the plurality of subframes, based at least in part on the determined bundling size.

Certain aspects of the present disclosure provide an apparatus for wireless communications. The apparatus generally includes means for determining a plurality of subframes in which a UE may transmit a bundled RACH message to the apparatus, means for determining, within the subframes, at least one narrowband region for receiving the RACH message, and means for determining a bundling size for the RACH message. The bundling size indicates a number of the plurality of subframes in which the RACH message is transmitted by the UE. The apparatus also includes means for receiving the RACH message in the narrowband region of the plurality of subframes, based at least in part on the determined bundling size.

Certain aspects of the present disclosure provide an apparatus for wireless communications. The apparatus generally includes at least one processor configured to determine a plurality of subframes in which a UE may transmit a bundled RACH message to the apparatus, determine, within the subframes, at least one narrowband region for receiving the RACH message, and determine a bundling size for the RACH message. The bundling size indicates a number of the plurality of subframes in which the RACH message is transmitted by the UE. The apparatus may also include a receiver configured to receive the RACH message in the narrowband region of the plurality of subframes, based at least in part on the determined bundling size. The apparatus may further include a memory coupled with the at least one processor.

Certain aspects of the present disclosure provide a computer-readable medium having computer executable code stored thereon. The computer executable code generally includes code for determining a plurality of subframes in which a UE may transmit a bundled RACH message to a BS, determining, within the subframes, at least one narrowband region for receiving the RACH message, and determining a bundling size for the RACH message. The bundling size indicates a number of the plurality of subframes in which the RACH message is transmitted by the UE. The computer executable code also includes code for receiving the RACH message in the narrowband region of the plurality of subframes, based at least in part on the determined bundling size.

Certain aspects of the present disclosure provide a method for wireless communication. The method generally includes selecting a RACH preamble from a set of RACH preambles, transmitting a physical RACH (PRACH) message comprising the RACH preamble, determining random access response (RAR) resources on which to receive a RAR message based at least in part on the RACH preamble, and receiving the RAR message on the RAR resources.

Certain aspects of the present disclosure provide a method for wireless communication. The method generally includes receiving a PRACH message comprising a RACH preamble, and selecting RAR resources on which to transmit a RAR message based at least in part on the RACH preamble.

Certain aspects of the present disclosure provide an apparatus for wireless communication. The apparatus generally includes means for selecting a RACH preamble from a set of RACH preambles, means for transmitting a PRACH message comprising the RACH preamble, means for determining RAR resources on which to receive a RAR message based at least in part on the RACH preamble, and means for receiving the RAR message on the RAR resources.

Certain aspects of the present disclosure provide an apparatus for wireless communication. The apparatus generally includes means for receiving a PRACH message comprising a RACH preamble, and means for selecting RAR resources on which to transmit a RAR message based at least in part on the RACH preamble.

Certain aspects of the present disclosure provide an apparatus for wireless communication. The apparatus includes at least one processor, a memory coupled to the at least one processor, a transmitter and a receiver. The at least one processor is configured to select a RACH preamble from a set of RACH preambles, transmit, via the transmitter, a PRACH message comprising the RACH preamble, determine RAR resources on which to receive a RAR message based at least in part on the RACH preamble, and receive, via the receiver, the RAR message on the RAR resources.

Certain aspects of the present disclosure provide an apparatus for wireless communication. The apparatus includes at least one processor, a memory coupled to the at least one processor, and a receiver. The receiver is configured to receive a PRACH message comprising a RACH preamble. The at least one processor is configured to select RAR resources on which to transmit a RAR message based at least in part on the RACH preamble.

Certain aspects of the present disclosure provide a method for wireless communication. The method generally includes selecting a bundling size for a PRACH message, determining a PRACH resource for a PRACH message transmission based at least in part on the bundling size, and transmitting the PRACH message utilizing the PRACH resource.

In some aspects, the PRACH resource may include a narrowband frequency region of a carrier bandwidth. Determining the PRACH resource may include determining the narrowband frequency region from a set of narrowband frequency regions based at least in part on the bundling size. The method may also include identifying the set of narrowband frequency regions from a system information broadcast message. The method may further include selecting a RACH preamble, wherein the PRACH resource is determined irrespective of the RACH preamble, and wherein the PRACH message comprises the RACH preamble.

In some aspects, the PRACH resource may include a RACH preamble. Determining the PRACH resource may include determining the RACH preamble from a set of RACH preambles based at least in part on the bundling size. The method may also include selecting a narrowband frequency region of a carrier bandwidth for the PRACH message transmission irrespective of the RACH preamble. In some cases, determining the RACH preamble may include randomly selecting the RACH preamble from the set of RACH preambles.

The method may also include determining a starting transmission time for the PRACH message based at least in part on the bundling size. Determining the starting transmission time may include randomly selecting the starting transmission time from a set of starting transmission times.

The method may further include selecting a transmission power for the PRACH message. The PRACH resource may be determined based at least in part on the selected transmission power.

Certain aspects of the present disclosure provide a method for wireless communication. The method generally includes receiving a PRACH message transmitted utilizing a first PRACH resource, and determining a second PRACH resource for the PRACH message based at least in part on the first PRACH resource utilized for the PRACH message. The first or second PRACH message may include at least one of a RACH preamble, a PRACH message bundling size, a narrowband frequency resource, or a starting transmission time.

Numerous other aspects are provided including methods, apparatus, systems, computer program products, computer-readable medium, and processing systems. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 5A and 5B illustrate an example of machine type communications (MTC) co-existence within a wideband system, such as long term evolution (LTE), in accordance with certain aspects of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
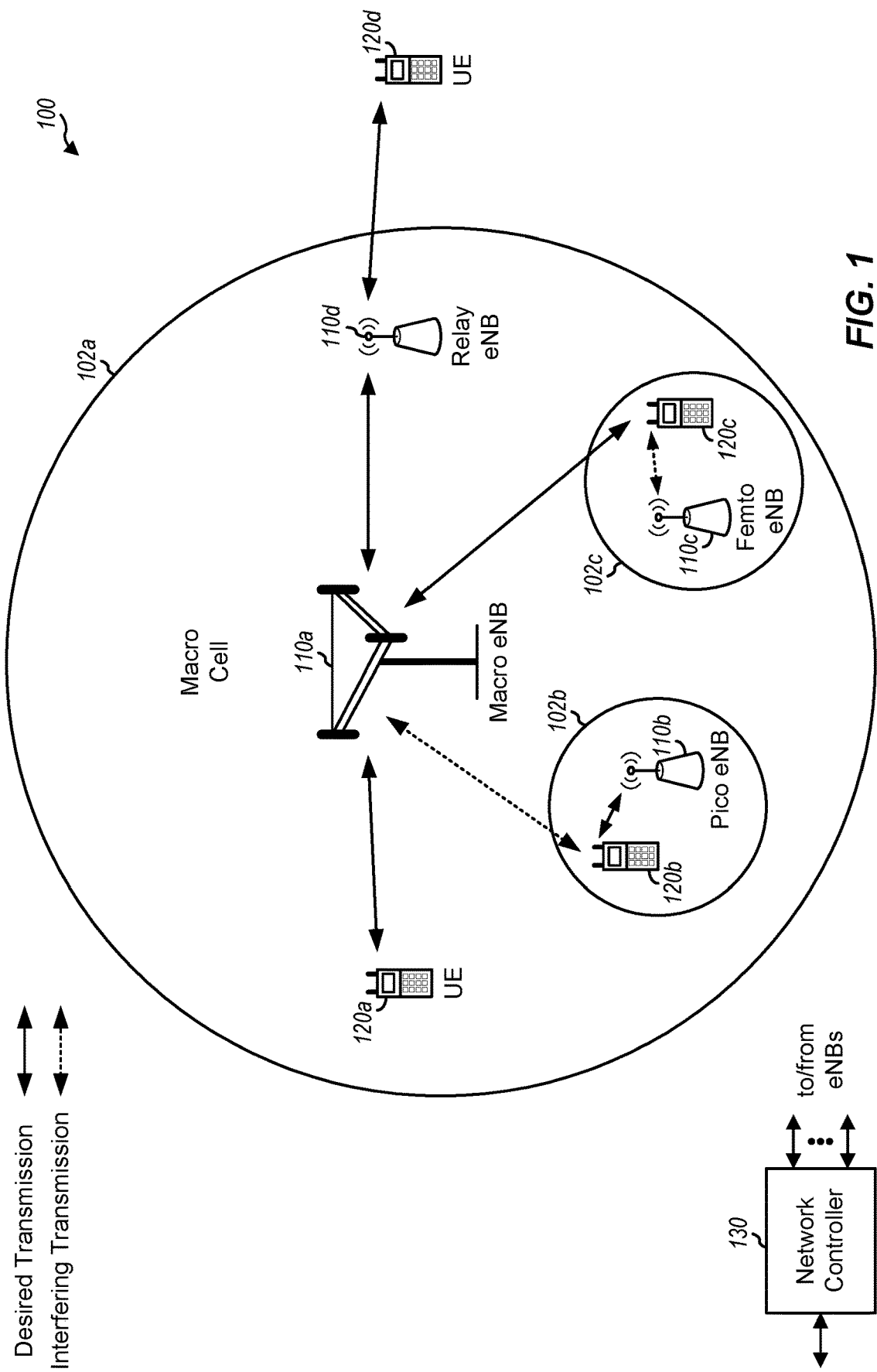
FIG. 1 is a block diagram conceptually illustrating an example wireless communication network, in accordance with certain aspects of the present disclosure.

Aspects of the present disclosure provide a random access procedure that may be used by devices that operate in machine type communication (MTC) and/or eMTC. As will be described in more detail below, the techniques presented herein may allow devices in MTC and/or eMTC to determine (and/or adapt) the location, timing and/or size of one or more bundled messages (e.g., random access channel (RACH) preamble, random access response message, connection request message, and/or contention resolution message) used in the random access procedure. As will also be described in more detail below, aspects presented herein may also provide techniques for prioritizing broadcast transmissions in MTC and/or eMTC.

Aspects of the present disclosure provide techniques for devices with limited communication resources, such as MTC devices (e.g., low cost MTC devices, low cost eMTC devices). The low cost MTC devices may co-exist with other legacy devices in a particular radio access technology (RAT) (e.g., long term evolution (LTE), etc.) and may operate on one or more narrowband regions partitioned out of an available system bandwidth that is supported by the particular RAT. The low cost MTC devices may also support different modes of operation, such as a coverage enhanced mode (e.g., where repetitions of the same message may be bundled or transmitted across multiple subframes), a normal coverage mode (e.g., where repetitions may not be transmitted), etc.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below. LTE and LTE-A are referred to generally as LTE.

FIG. 1 illustrates an example wireless communication network 100 with base stations (BSs) and user equipments (UEs), in which aspects of the present disclosure may be practiced. For example, one or more UEs (e.g., low cost MTC UEs, low cost eMTC UEs, etc.) in the wireless communication network 100 may utilize the random access procedure, described in more detail below, to initiate communications with one or more BSs in the wireless communication network.

According to the techniques presented herein, the eNBs 110 and UEs 120 in the wireless communication network 100 may be able to determine (and/or adapt), for each of the bundled messages used in the random access procedure, the location (e.g., the one or more narrowband region(s), out of the available system bandwidth, that may be used for the bundled messages), the timing (e.g., the one or more subframes that may be used for the bundled messages), and/or the size of the bundled messages (e.g., the number of the one or more subframes that may be used for the bundled messages). Also, according to various aspects, one or more broadcast transmission(s) in MTC and/or eMTC, which may be utilized in the wireless communication network 100, may be prioritized according to the techniques presented herein.

The wireless communication network 100 may be an LTE network or some other wireless network. Wireless communication network 100 may include a number of evolved Node Bs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless communication network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay (station) eNB 110d may communicate with macro eNB 110a and a UE 120d in order to facilitate communication between eNB 110a and UE 120d. A relay station may also be referred to as a relay eNB, a relay base station, a relay, etc.

Wireless communication network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless communication network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless communication network 100, and each UE may be stationary or mobile. A UE may also be referred to as an access terminal, a terminal, a mobile station (MS), a subscriber unit, a station (STA), etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, an entertainment device (e.g., music player, gaming device, etc.), a camera, a vehicular device, a navigation device, a drone, a robot/robotic device, a wearable device (e.g., smart watch, smart clothing, smart wristband, smart ring, smart bracelet, smart glasses, virtual reality goggles), etc.

One or more UEs 120 in the wireless communication network 100 (e.g., an LTE network) may also be low cost, low data rate devices, e.g., such as low cost MTC UEs, low cost eMTC UEs, etc. The low cost UEs may co-exist with legacy and/or advanced UEs in the LTE network and may have one or more capabilities that are limited when compared to the other UEs (e.g., non-low cost UEs) in the wireless network. For example, when compared to legacy and/or advanced UEs in the LTE network, the low cost UEs may operate with one or more of the following: a reduction in maximum bandwidth (relative to legacy UEs), a single receive radio frequency (RF) chain, reduction of peak rate, reduction of transmit power, rank 1 transmission, half duplex operation, etc. As used herein, devices with limited communication resources, such as MTC devices, eMTC devices, etc. are referred to generally as low cost UEs. Similarly, legacy devices, such as legacy and/or advanced UEs (e.g., in LTE) are referred to generally as non-low cost UEs.

As mentioned above, one or more UEs 120 in the wireless communication system may use a random access procedure to initiate communications with a eNB 110. The random access procedure, in general, may be used in various situations, such as initial access from a disconnected state or radio failure, handover requiring a random access procedure, downlink or uplink data arrival during a connected state after which the UE 120 has lost synchronization, uplink data arrival where there are no dedicated scheduling request channels available and/or other various situations. Examples of the random access procedure may include contention based random access procedures, which may be initiated on a random access channel (RACH), and contention-free (e.g., non-contention based) random access procedures. The difference between the two procedures may be whether or not there is a possibility for failure using an overlapping random access preamble.

As also mentioned above, according to certain aspects, a random access procedure may also be used in MTC and/or eMTC which may co-exist with LTE in the wireless communication network 100. However, as will be described in more detail, due, in part, to support for narrowband operation and/or bundling in MTC and eMTC, the random access procedure used by one or more low cost UEs 120 in MTC and/or eMTC may be different from the random access procedure used by non-low cost UEs. Accordingly, aspects presented herein provide techniques for a random access procedure that may be utilized by low cost UEs 120 in MTC and/or eMTC.

Figure 2:
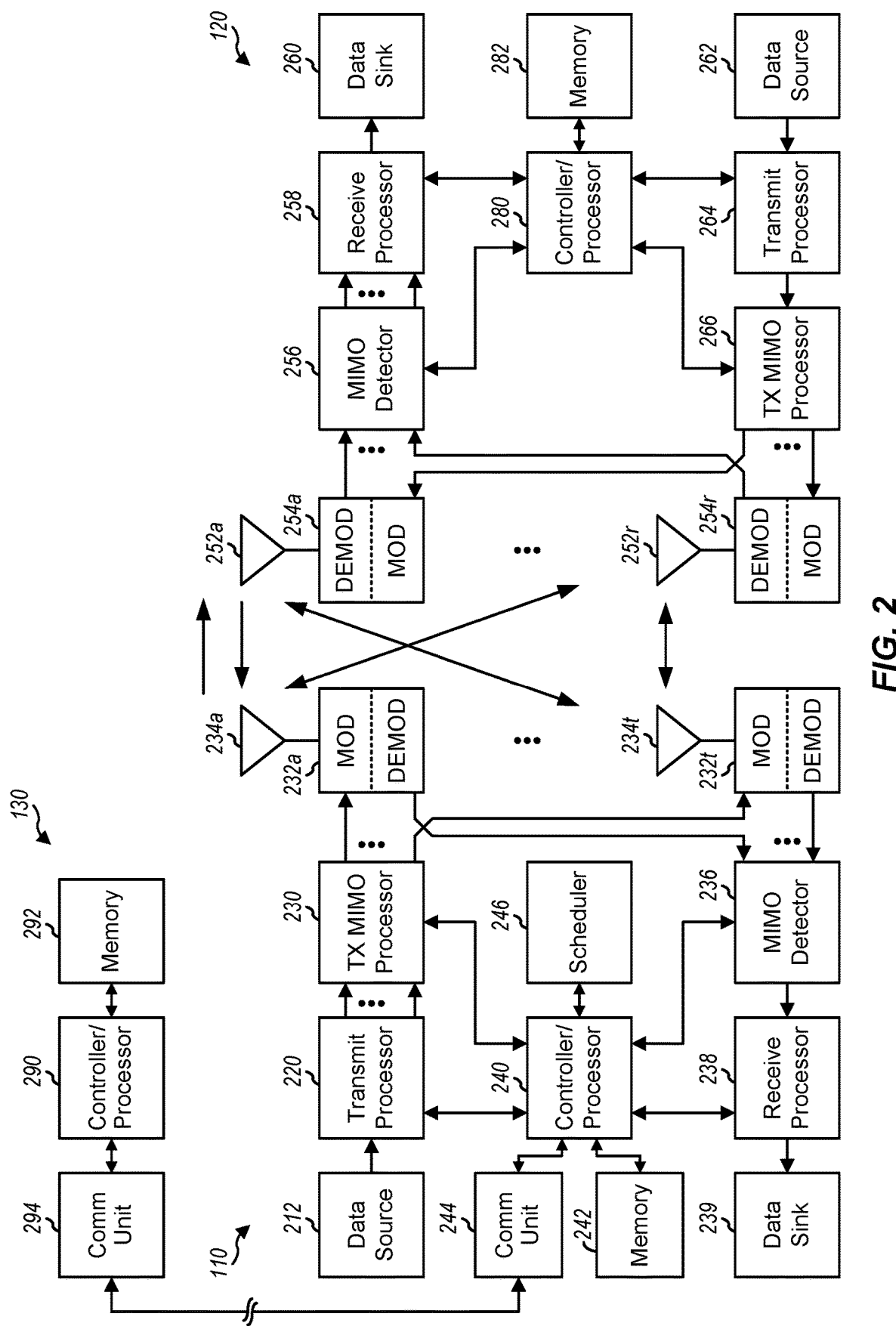
FIG. 2 is a block diagram conceptually illustrating an example of an evolved nodeB (eNB) in communication with a user equipment (UE) in a wireless communications network, in accordance with certain aspects of the present disclosure.

FIG. 2 is a block diagram of a design of BS/eNB 110 and UE 120, which may be one of the BSs/eNBs 110 and one of the UEs 120, respectively, in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other BSs and may provide received signals to demodulators (DEMODs) 254a through 254r, respectively. Each DEMOD 254 may condition (e.g., filter, amplify, downconvert, and digitize) its received signal to obtain input samples. Each DEMOD 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254a through 254r (e.g., for SC-FDM, OFDM, etc.), and transmitted to BS 110. At BS 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively. For example, controller/processor 240 and/or other processors and modules at BS 110 may perform or direct operations 700 illustrated in FIG. 7 and/or other processes for the techniques described herein. Similarly, controller/processor 280 and/or other processors and modules at UE 120 may perform or direct operations 600 illustrated in FIG. 6 and/or processes for the techniques described herein. Memories 242 and 282 may store data and program codes for BS 110 and UE 120, respectively. A scheduler 246 may schedule UEs for data transmission on the downlink and/or uplink.

Figure 3:
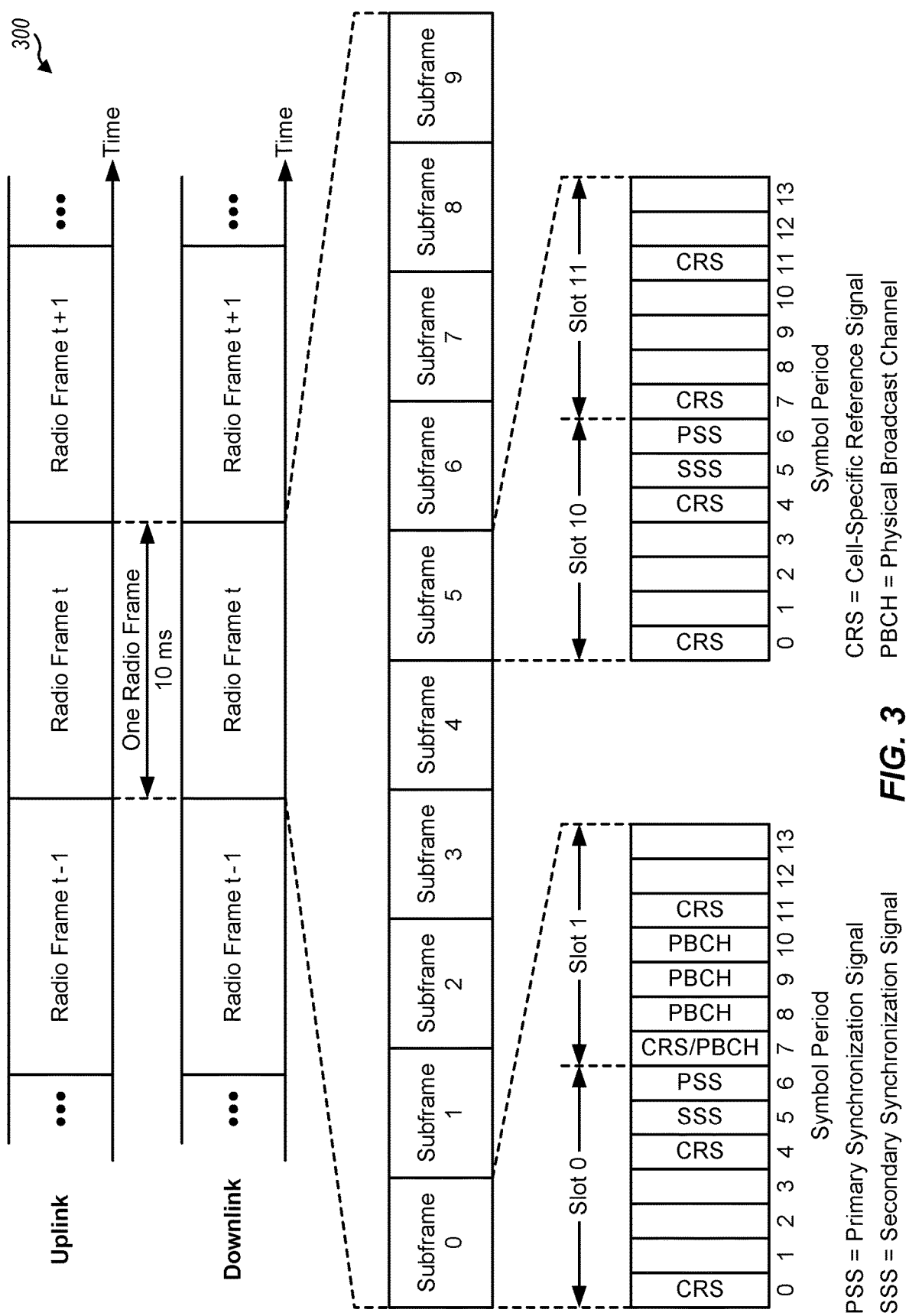
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
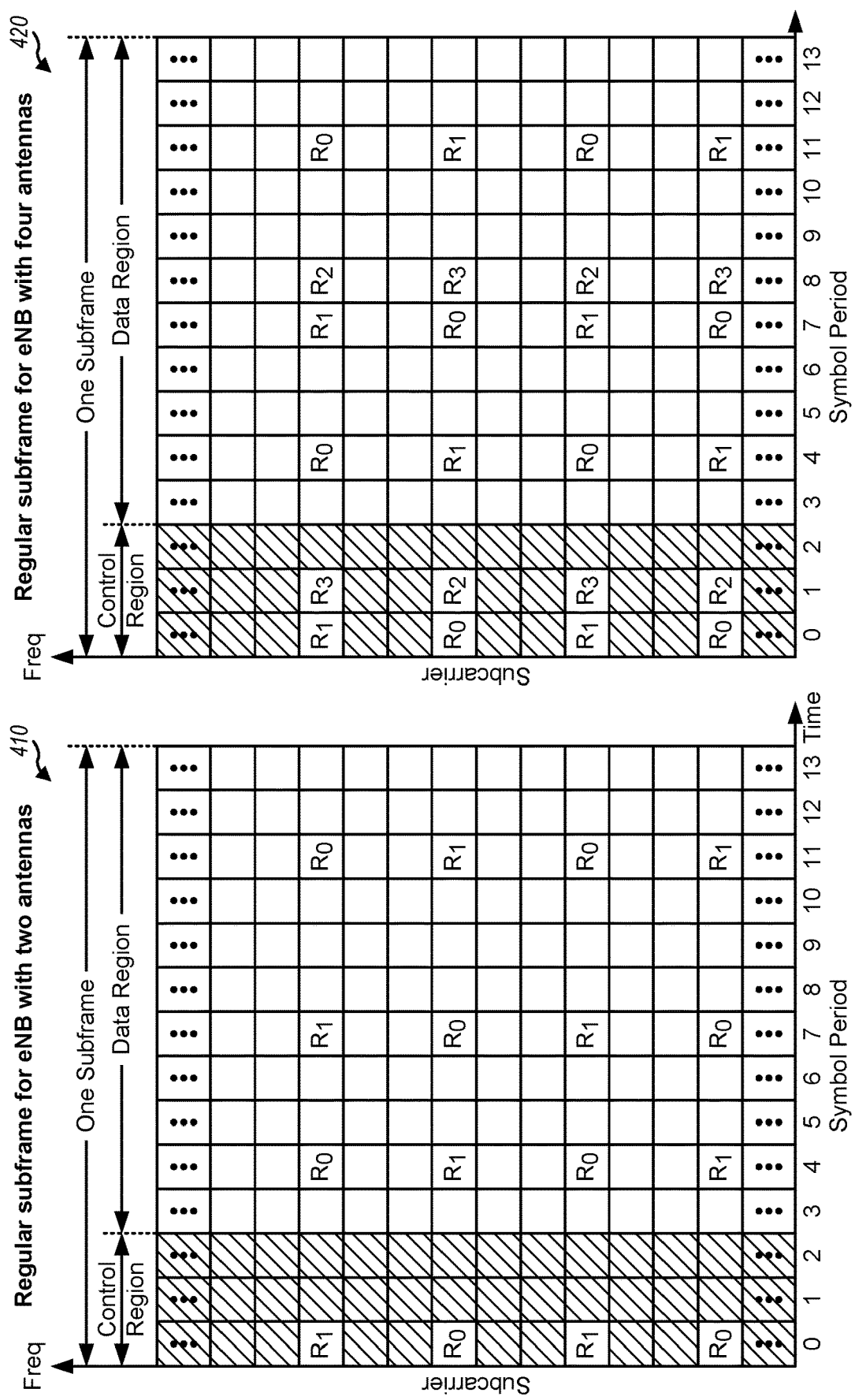
FIG. 4 illustrates example subframe formats for the downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

As mentioned above, one or more UEs in the wireless communication network (e.g., wireless communication network 100) may be devices that have limited communication resources, such as low cost UEs, as compared to other (non-low cost) devices in the wireless communication network.

In some systems, for example, in LTE Rel-13, a low cost UE may be limited to a particular narrowband assignment (e.g., of no more than six resource blocks (RBs)) within the available system bandwidth. However, the low cost UE may be able to re-tune (e.g., to operate and/or camp) to different narrowband regions within the available system bandwidth of the LTE system, for example, in order to co-exist within the LTE system.

As another example of coexistence within the LTE system, low cost UEs can receive (with repetition) legacy physical broadcast channel (PBCH) (e.g., the LTE physical channel that, in general, carries parameters that may be used for initial access to the cell) and support one or more legacy physical random access channel (PRACH) formats. For example, the low cost UE can receive the legacy PBCH with one or more additional repetitions of the PBCH across multiple subframes. As another example, the low cost UE can transmit one or more repetitions of PRACH (e.g., with one or more PRACH formats supported) to an eNB (e.g., eNB 110) in the LTE system. The PRACH can be used to identify the low cost UE. Also, the number of repeated PRACH attempts can be configured by the eNB.

The low cost UE may also be a link budget limited device and may operate in different modes of operation (e.g. using different numbers of repetitions for messages transmitted to or from the low cost UE) based on its link budget limitation. For example, in some cases, the low cost UE may operate in a normal coverage mode in which there is little to no repetition (e.g., the amount of repetition needed for the UE to successfully receive and/or transmit a message may be low or repetition may not even be needed). Alternatively, in some cases, the low cost UE may operate in a coverage enhancement (CE) mode in which there may be high amounts of repetition. For example, for a 328 bit payload, a low cost UE in CE mode may need 150 or more repetitions of the payload in order to successfully transmit and/or receive the payload.

In some cases, e.g., for LTE Rel-13, the low cost UE may have limited capabilities with respect to its reception of broadcast transmissions (e.g., such as for system information blocks (SIBs), paging messages, random access response (RAR) messages, etc.) and unicast transmissions. For example, the maximum transport block (TB) size for a broadcast transmission received by the low cost UE may be limited to 1000 bits. Additionally, in some cases, the low cost UE may not be able to receive more than one unicast TB in a subframe. In some cases (e.g., for both the CE mode and normal mode described above), the low cost UE may not be able to receive more than one broadcast TB in a subframe. Further, in some cases, the low cost UE may not be able to receive both a unicast TB and a broadcast TB in a subframe.

For MTC, low cost UEs that co-exist in the LTE system may also support new messages for certain procedures, such as paging, random access procedure, reception of broadcast system information, etc. (e.g., as opposed to conventional messages used in LTE for these procedures). In other words, these new messages for paging, random access procedure, etc. may be separate from the messages used for similar procedures associated with non-low cost UEs. For example, as compared to conventional paging messages used in LTE, low cost UEs may be able to monitor and/or receive paging messages that non-low cost UEs may not be able to monitor and/or receive. Similarly, as compared to conventional RAR messages used in a conventional random access procedure, low cost UEs may be able to receive RAR messages that non-low cost UEs may not be able to receive. The new paging and RAR messages associated with low cost UEs may also be repeated one or more times (e.g., bundled). In addition, different numbers of repetitions (e.g., different bundling sizes) for the new messages may be supported.

Example MTC Coexistence Within a Wideband System

As mentioned above, MTC and/or eMTC operation may be supported (e.g., in coexistence with LTE or some other RAT) in the wireless communication network (e.g., wireless communication network 100). FIGS. 5A and 5B, for example, illustrate an example of how low cost UEs in MTC operation may co-exist within a wideband system, such as LTE.

As illustrated in the example frame structure 500A of FIG. 5A, subframes 502 associated with MTC and/or eMTC operation may be time division multiplexed (TDM) with regular subframes 504 associated with LTE (or some other RAT). As shown, in one example implementation, the number of subframes 502 associated with (e)MTC operation may be relatively small compared to the number of regular subframes 504.

Additionally or alternatively, as illustrated in the example frame structure of subframe 500B of FIG. 5B, one or more narrowbands used by low cost UEs in MTC may be frequency division multiplexed (FDM) within the wider bandwidth supported by LTE. Multiple narrowband regions may be supported for MTC and/or eMTC operation, with each narrowband region spanning a bandwidth that is no greater than a total of 6 RBs. In some cases, each low cost UE in MTC operation may operate within one narrowband region (e.g., at 1.4 MHz or 6 RBs) at a time. However, low cost UEs in MTC operation, at any given time, may re-tune to other narrowband regions in the wider system bandwidth. In some examples, multiple low cost UEs may be served by the same narrowband region. In other examples, multiple low cost UEs may be served by different narrowband regions (e.g., with each narrowband region spanning 6 RBs). In yet other examples, different combinations of low cost UEs may be served by one or more same narrowband regions and/or one or more different narrowband regions.

As shown in FIG. 5B, in a subframe 500B, the low cost UE can monitor a wideband region 506 for legacy control information and wideband regions 508A and 508B for data. The low cost UEs may operate (e.g., monitor/receive/transmit) within the narrowband regions for various different operations. For example, as shown in FIG. 5B, a first narrowband region 510 (e.g., spanning no more than 6 RBs) of a subframe may be monitored by one or more low cost UEs for either a primary synchronization signal (PSS), a secondary synchronization signal (SSS), a physical broadcast channel (PBCH), MTC signaling, or paging transmission from a BS in the wireless communication network. As also shown in FIG. 5B, the low cost UE can retune to a second narrowband region 512 (e.g., also spanning no more than 6 RBs) of a subframe to transmit a RACH or data previously configured in signaling received from a BS. In some cases, the second narrowband region 512 may be utilized by the same low cost UEs that utilized the first narrowband region 510 (e.g., the low cost UEs may have re-tuned to the second narrowband region to transmit after monitoring in the first narrowband region). In some cases (although not shown), the second narrowband region 512 may be utilized by different low cost UEs than the low cost UEs that utilized the first narrowband region 510.

Although the examples described herein assume a narrowband of 6 RBS, those skilled in the art will recognize that the techniques presented herein may also be applied to different sizes of narrowband regions.

Example Random Access Procedure for eMTC

As mentioned above, in certain systems (e.g., LTE Rel-13 systems), narrowband operation for eMTC may be supported. Further, as also mentioned above, different modes of operation for low cost devices, such as low cost UEs in eMTC, which may use different amounts of repetition before a message is successfully received and/or transmitted by the low cost UEs, may also be supported.

Figure 8:
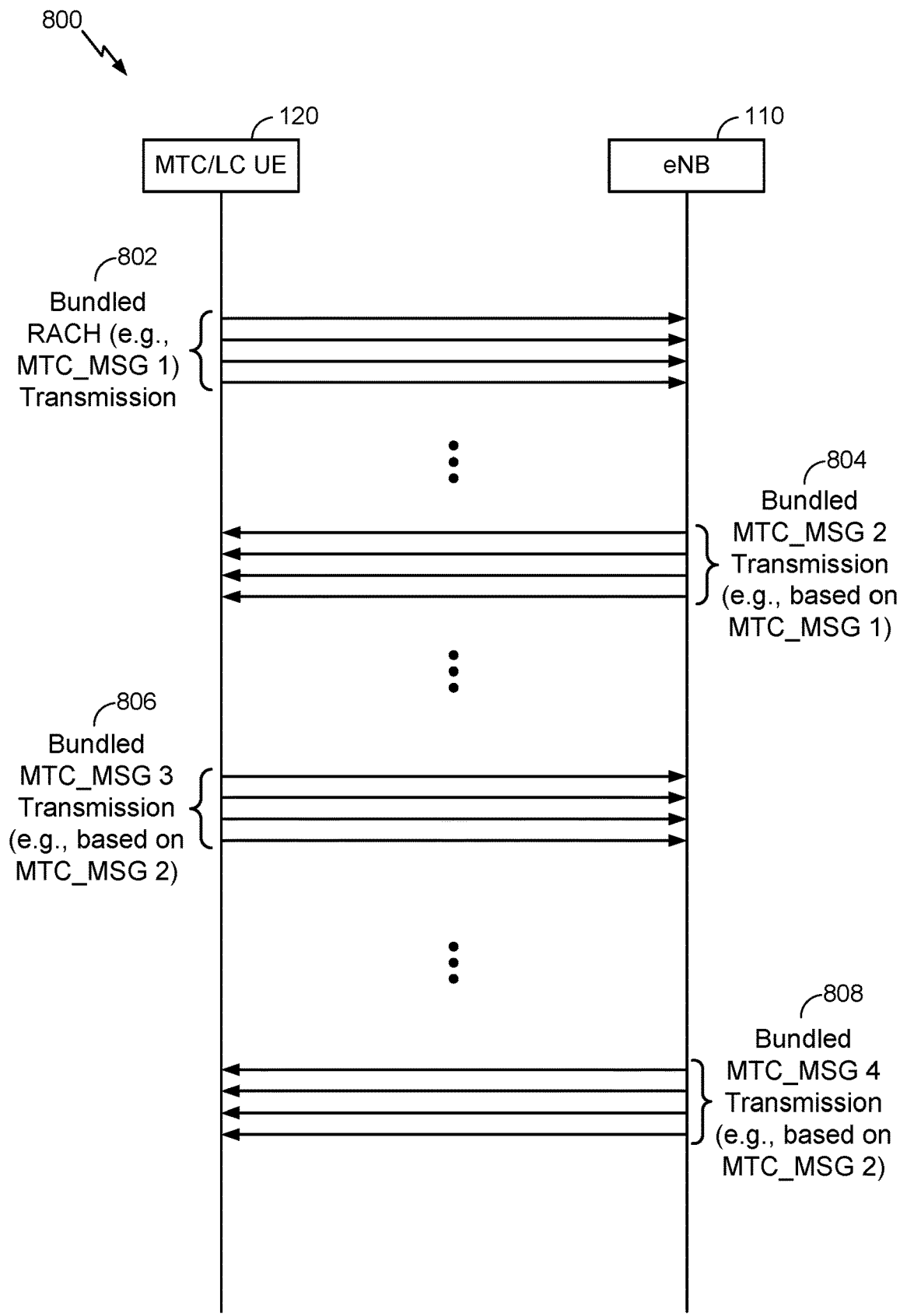
FIG. 8 illustrates an example of call flow for a random access procedure in MTC and/or eMTC.

According to certain aspects, the random access procedure in MTC and/or eMTC may also use narrowband operation and different amounts of bundling for the different messages used in the random access procedure. For example, as shown in FIG. 8, the low cost UEs and/or eNBs in eMTC may use (e.g., monitor/transmit/receive) a bundled (e.g., one or more repetitions) random access channel (RACH) preamble (MTC_MSG 1), a bundled random access response (RAR) message (MTC_MSG 2), a bundled connection request message (MTC_MSG 3), and/or a bundled contention resolution message (MTC_MSG 4) in the random access procedure. In addition, each of the bundled messages used in the random access procedure may be transmitted/received in a plurality of subframes and in one or more narrowbands partitioned out of the available system bandwidth. Further, the bundling size of each of the bundled messages (e.g., the number of plurality of subframes in which each of the bundled messages is transmitted) may vary.

Therefore, in some situations, due to support for these features, it may be helpful for the BS and/or the low cost UEs to know the particular manner (e.g., location, timing, and amount) in which each of the bundled messages used in the random access procedure is transmitted/received.

Accordingly, as mentioned above, aspects presented herein provide techniques that allow the low cost UEs and BSs to determine (and/or adapt), for each of the bundled messages used in the random access procedure, the location (e.g., the one or more narrowband region(s), out of the available system bandwidth, that may be used for the bundled messages), the timing (e.g., the one or more subframes that may be used for the bundled messages), and/or the size (e.g., the number of the one or more subframes that may be used for the bundled messages) of the bundled messages.

Figure 6:
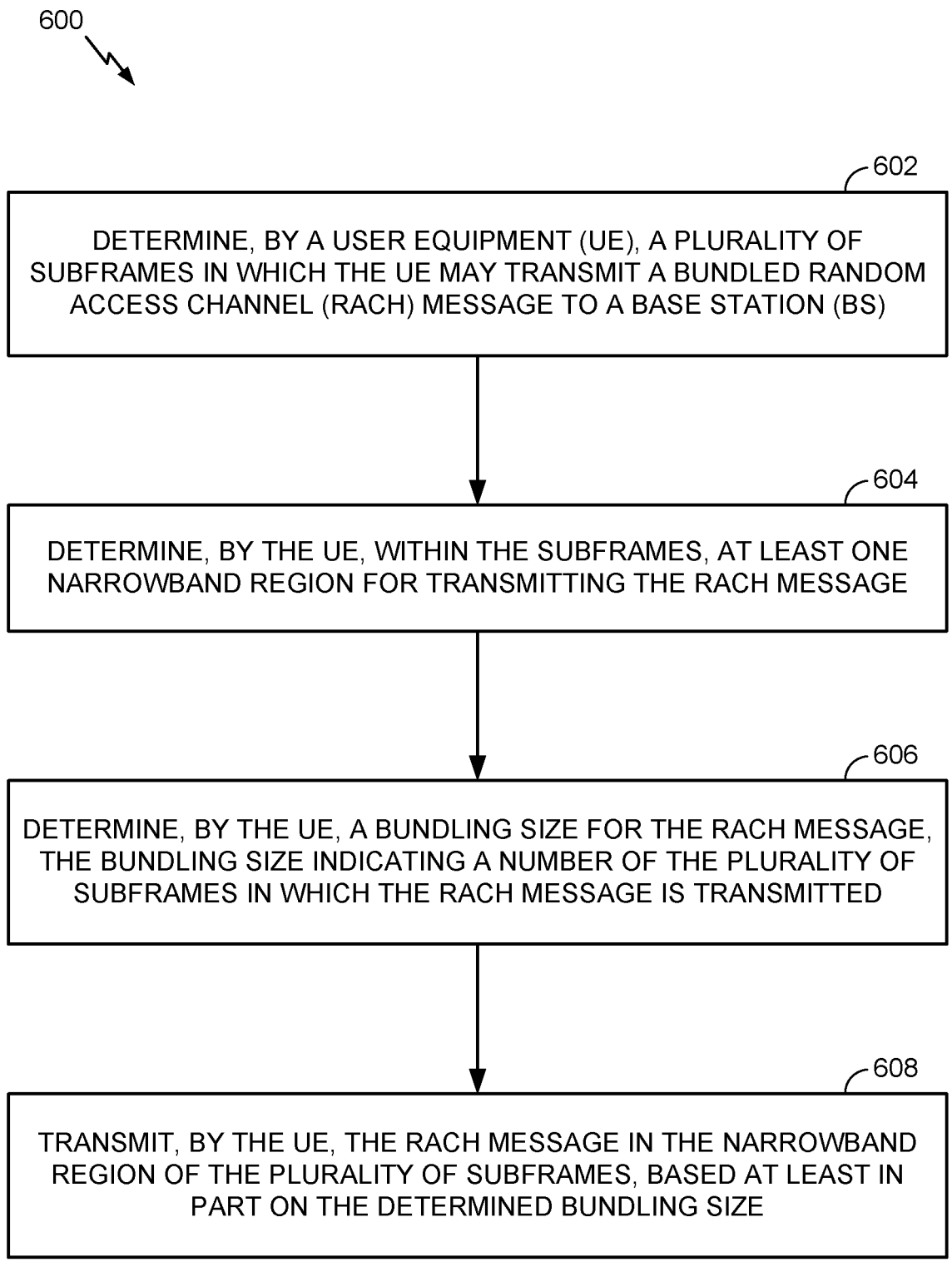
FIG. 6 illustrates example operations for wireless communications, by a UE, in accordance with certain aspects of the present disclosure.

FIG. 6 illustrates example operations 600 for wireless communications, in accordance with certain aspects of the present disclosure. The operations 600 can be performed by a UE, such as a low cost UE, which may be one of the UEs 120 illustrated in FIGS. 1 and 2.

The operations 600 may begin, at 602, where the UE determines a plurality of subframes in which the UE may transmit a bundled RACH message to a BS. At 604, the UE determines, within the subframes, at least one narrowband region for transmitting the RACH message. At 606, the UE determines a bundling size for the RACH message, the bundling size indicating a number of the plurality of subframes in which the RACH message is transmitted. At 608, the UE transmits the RACH message in the narrowband region of the plurality of subframes, based at least in part on the determined bundling size.

Figure 7:
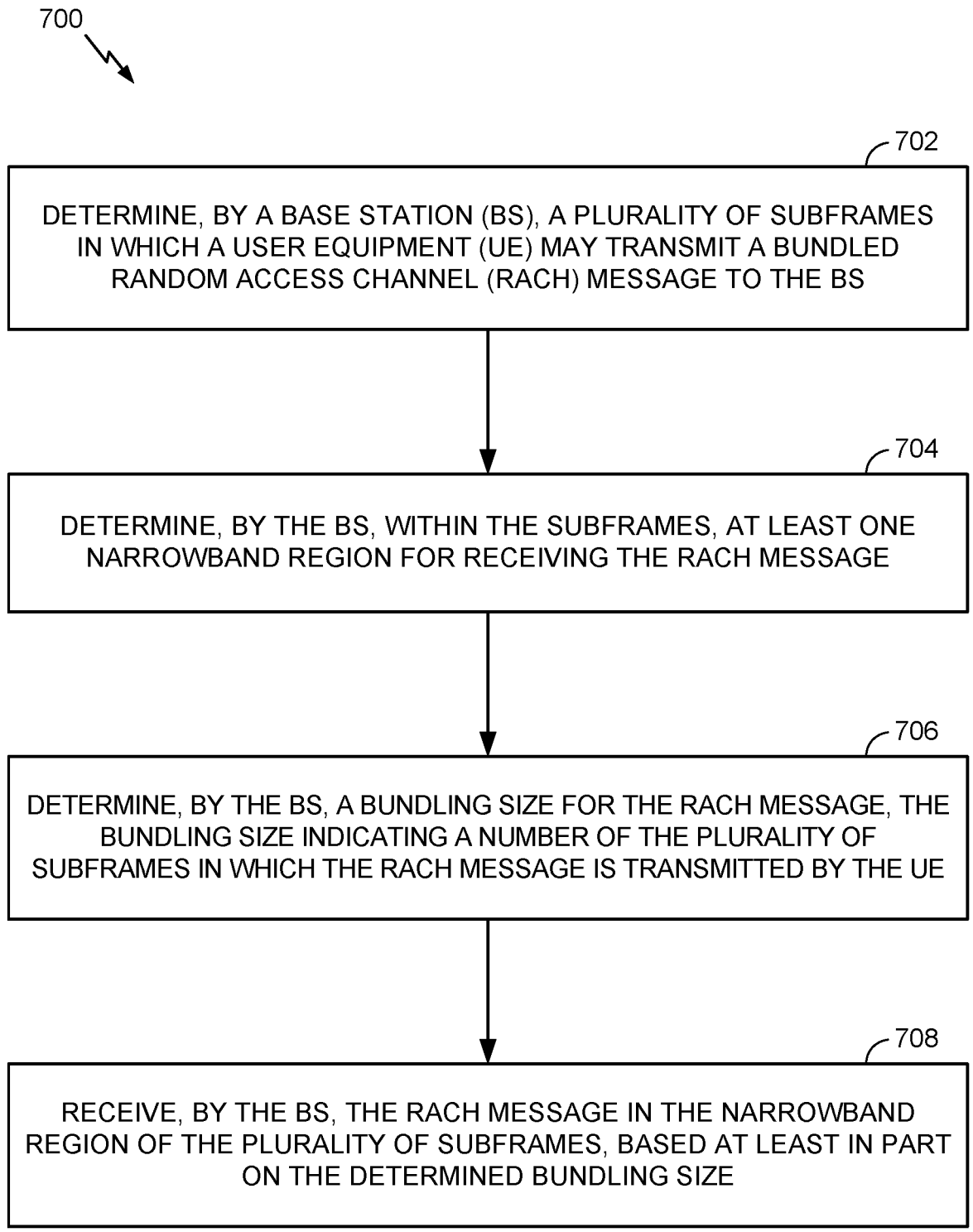
FIG. 7 illustrates example operations for wireless communications, by a BS, in accordance with certain aspects of the present disclosure.

FIG. 7 illustrates example operations 700 for wireless communications, in accordance with certain aspects of the present disclosure. The operations 700 can be performed by a BS, such as one of the BSs/eNBs 110 illustrated in FIGS. 1 and 2.

The operations 700 may begin, at 702, where the BS determines a plurality of subframes in which a UE (e.g., low cost UE) may transmit a bundled RACH message to the BS. At 704, the BS determines, within the subframes, at least one narrowband region for receiving the RACH message. At 706, the BS determines a bundling size for the RACH message, the bundling size indicating a number of the plurality of subframes in which the RACH message is transmitted by the UE. At 708, the BS receives the RACH message in the narrowband region of the plurality of subframes, based at least in part on the determined bundling size.

FIG. 8 illustrates an example of call flow 800 for a random access procedure in MTC and/or eMTC. The eNB and MTC device (e.g., a low cost UE) illustrated in FIG. 8 may be, e.g., any of the BSs/eNBs 110 and UEs 120, respectively, illustrated in FIGS. 1-2.

In one reference example of a random access procedure (in MTC, eMTC, etc.), at 802, the UE 120 transmits a bundled RACH preamble (e.g., MTC_MSG 1) to the eNB 110 (e.g., in order to initiate communications with the eNB, etc.). The UE may select a RACH preamble for the RACH message from a set of RACH preambles. The UE may transmit the bundled RACH message (including the selected RACH preamble) to the eNB. According to certain aspects, the UE 120 transmits the bundled RACH message to the eNB 110 with one or more different bundling sizes (e.g., a bundling size of one, two, three, etc.). For example, in some cases, the amount of bundling used for the bundled RACH message may be based, in part, on the particular coverage mode (e.g., CE mode, normal mode, etc.) that the UE 120 is operating in. As mentioned above, when the UE 120 operates in normal mode, the UE 120 may use a lower amount of bundling relative to the amount of bundling the UE 120 uses when operating in CE mode. In general, however, the UE 120 and/or eNB 110 may support multiple bundle sizes for different coverage enhancements.

Accordingly, aspects presented herein provide techniques that allow the UE 120 and/or eNB 110 to determine the bundling size for the bundled RACH message transmitted to the eNB 110 in the random access procedure. In one aspect, the UE 120 and/or eNB 110 may determine the bundling size for the bundled RACH message based at least in part on broadcast signaling from the eNB 110. As mentioned above, the broadcast signaling used to indicate the bundling size may be broadcast signaling that is separate from broadcast signaling that is used to indicate system information to non-low cost UEs.

According to certain aspects, the UE 120 and/or eNB 110 may determine the bundling size for the bundled RACH message based at least in part on a location of one or more narrowband regions that are partitioned out of the available system bandwidth. For example, in some cases, each of the one or more narrowband regions may have a fixed bundling size that may be used for RACH transmissions. In some cases, each of the narrowband regions may have a different fixed bundling size for RACH transmissions. In some cases, one or more narrowband regions may have the same fixed bundling size as one or more other narrowband regions.

In certain aspects, the one or more narrowband regions may support different coverage modes for the UE 120 and the bundling size for the RACH transmission may be determined based at least in part on the one or more narrowband regions that support the particular coverage mode for the UE 120. For example, in some cases, if the UE 120 is operating in a normal coverage mode, the UE 120 may identify one or more narrowband regions that support its normal coverage mode. The UE 120 may then determine a bundling size for the RACH transmission, for example, based at least in part on the fixed bundling size used by the one or more narrowband regions that support the normal coverage mode. Similar examples may apply for the CE mode and/or other modes of the UE 120.

According to certain aspects, the UE 120 and/or the eNB 110 may determine the bundling size for the bundled RACH message based at least in part on a starting subframe of the bundled RACH message. For example, within each of the one or more narrowband regions, multiple bundling sizes may be supported. In one case, within a particular narrowband region, a first set of subframes may have a particular bundling size for RACH transmissions and a second set of subframes may have another bundling size for other transmissions. In these cases, within each of the one or more narrowband regions, the bundling size that is used for the bundled RACH transmission may vary depending on the subframe (e.g., in the first set of subframes) in which the bundled RACH transmission may start.

According to certain aspects, the UE 120 and/or the eNB 110 may determine the bundling size for the bundled RACH message based at least in part on an estimated CE target (e.g., for a CE mode) of the low cost UE. For example, the UE 120 (and/or the eNB 110) may identify an estimated CE target that may be used for RACH transmissions based at least in part on the quality of radio conditions between the UE 120 and the eNB 110. In one case, the UE 120 may use the downlink (DL) pathloss to determine an estimated CE target. For example, based on the DL pathloss, the UE 120 may determine that the UE 120 should operate in the CE mode and use a relatively large bundling size (e.g., compared to a bundling size used for the normal mode) for the bundled RACH. In other examples, the UE 120 may determine one or more other bundling sizes for the bundled RACH (e.g., based on other quality measurements).

According to certain aspects, the UE 120 and/or the eNB 110 may determine the bundling size for the bundled RACH message based on success or failure of the eNB 110 to successfully decode a previously transmitted bundled RACH message. For example, in some cases, the UE 120 may determine a success (of the eNB 110 to decode a previously transmitted bundled RACH message, such as MTC_MSG 1) if the UE 120 successfully decoded a random access response (RAR) message from the eNB 110 for a previously transmitted bundled RACH (e.g., MTC_MSG 1). Similarly, in some cases, the UE 120 may determine a failure (of the eNB 110 to decode a previously transmitted bundled RACH message) if the UE 120 was not able to successfully decode a RAR message from the eNB 110 for a previously transmitted bundled RACH. In some cases (e.g., if the UE 120 determines a failure), the UE 120, in response to failure of the eNB 110 to successfully decode the previous bundled RACH message, may increase the bundling size relative to the bundling size used for the previous bundled RACH message.

Additionally or alternatively, in some cases, in response to failure of the eNB 110 to successfully decode the previous bundled RACH message, the UE 120 may increase the transmit power relative to the transmit power used to transmit the previous bundled RACH message. In certain aspects, the transmit power may be increased for the bundling size used for the previous bundled RACH message and/or the bundling size used for a subsequently transmitted bundled RACH message. Further, when transmitting the bundled RACH message, a RACH counter at the UE 120 may be increased only once per bundled RACH message (e.g., as opposed to being increased for every RACH message transmitted within a single bundled RACH).

As mentioned above, aspects presented herein also provide techniques that allow the UE 120 and/or eNB 110 to determine the plurality of subframes in which the UE 120 may transmit a bundled RACH to the eNB 110. In one aspect, the plurality of subframes may be determined based at least in part on particular subframes available as starting subframes for the bundled RACH message.

For example, if the UE 120 and/or eNB 110 determines a bundling size of four for the bundled RACH, in one case, each bundled RACH transmission may start at subframes 0, 4, 8, etc. (e.g., where each RACH transmission of the bundled RACH occurs in consecutive subframes). In another case, for example, with the same bundling size of four for the bundled RACH, each RACH transmission of the bundled RACH transmission may start at subframes 0, 2, 4, 6, etc. (e.g., where each RACH transmission of the bundled RACH occurs in non-consecutive subframes). In general, however, the determination of the starting subframe(s) for each bundled RACH transmission may be based at least in part on the particular subframe uplink/downlink configuration used in the frame.

As shown in FIG. 8, as part of the random access procedure, at 804, the eNB 110 transmits a bundled RAR message (e.g., MTC_MSG 2) to the UE 120, in response to receiving a bundled RACH message from the UE 120. The UE may determine RAR resources on which to receive the RAR message based at least in part on the RACH preamble, and receive the RAR message on the RAR resources. The RAR resources may include at least one of a narrowband frequency region of a carrier bandwidth, a starting transmission time, a starting subframe, or a bundling size. In some cases, the bundled RAR message may not support HARQ. As shown in FIG. 8, the bundling size for the bundled RAR message may be based, at least in part, on the bundled RACH message.

In some aspects, the UE may also identify one or more control channel decoding candidates based at least in part on the RACH preamble, and blindly decode the one or more control channel candidates. In some cases, identifying the one or more control channel decoding candidates may include determining at least one of an aggregation level (e.g., a number of control channel elements (CCEs) and/or enhanced control channel elements (eCCEs)), a RAR message bundling size, or a RAR message packet size. The UE may determine the RAR message packet size based, at least in part, on the RACH preamble. In some cases, the UE may select the RACH preamble based, at least in part, on a bundling size of a RAR message.

In certain aspects, the UE 120 and/or eNB 110 may determine the bundling size and/or narrowband regions for the bundled RAR message based at least in part on the RACH message selected by the UE. The RAR message bundling size and/or narrowband regions may further depend on at least one of a narrowband region or a bundling size of the bundled RACH message. For example, in some cases, the bundling size of the bundled RAR message may be the same as the bundling size of the bundled RACH message received from the low cost UE (e.g., a bundling size of four in one implementation shown in FIG. 8). In some cases, the bundling size of the bundled RAR message may be determined from the bundling size that is used in one or more of the narrowband regions for transmitting bundled RACH messages. In some cases, the bundling size of the RAR message may be independent of the bundling size of the PRACH message.

In certain aspects, the control and/or data portions of the RAR message may be bundled. For example, the control portion of the RAR message may have a bundling size that is the same or different from the bundling size used for the data portion of the RAR message. In some aspects, the bundling size and/or narrowband regions for the control portion of the RAR message (e.g., on ePDCCH) may be implicitly determined based, at least in part, on at least one property of the respective RACH message chosen by the UE. For example, the determination of the narrowband regions used for the control portion of the RAR message and/or the bundling size used for transmitting the control portion of the RAR message may be based at least in part on the bundling size and/or narrowband regions used to transmit the RACH message. In some cases, there may be a one-to-one mapping from the bundling size and/or narrowband regions used for the RACH message and the bundling size and/or narrowband regions used for the control portion of the RAR message.

According to certain aspects, the timing of the bundled RAR message may be based at least in part on a bundling size of the RACH message. For example, after transmitting a bundled RACH message, the UE 120 may expect a bundled RAR message within a certain time period following the transmission of the bundled RACH.

In conventional random access procedures (e.g., used by non-low cost UEs), the time period may only last for a certain period of time (e.g., around 10 ms). In eMTC, however, due to bundling, subframe configurations, etc., this time period may not be a sufficient period of time for the low cost UEs to detect whether or not a bundled RAR was successfully received. For example, as mentioned above, in part to due bundling, the first subframe of the RAR (including the control portion) may have to start at specific subframes.

Accordingly, techniques presented herein may allow for the time period (e.g., in eMTC) to be extended in order to allow more time for the low cost UE to detect the bundled RAR transmission without declaring a RACH failure. In some cases, the computation used for the random access radio network temporary identifier (RA-RNTI) used to address the bundled RAR message may be different from the computation used in legacy random access procedures. For example, in eMTC, the RA-RNTI computation may use either the subframe where the bundled RACH started or where it ended.

In certain aspects, the bundled RAR provides a grant for transmitting a connection request message. For example, the bundled RAR message may contain various amounts of information (e.g., in UL grants) that may be used by low cost UEs in transmitting/receiving one or more subsequent bundled messages in the random access procedure. As shown in FIG. 8, for example, both the bundled connection request message (e.g., MTC_MSG 3 at 806) and/or the bundled contention resolution message (e.g., MTC_MSG 4 at 808) may be based at least in part on the bundled RAR message.

In one case, the bundled RAR message may indicate (via an UL grant) at least one of a narrowband region or bundling size for the UE 120 to transmit a bundled connection request message (e.g., MTC_MSG 3) to the eNB 110. Alternatively or additionally, in some cases, the bundled RAR message may also indicate (via an UL grant) the narrowband region or bundling size for the UE 120 to receive a bundled contention resolution message (e.g., MTC_MSG 4) from the eNB 110.

In certain aspects, the RAR grant within the bundled RAR message may be defined differently from RAR grants used in legacy random access procedures. For example, for non-low cost UEs, the RAR grant may be 20 bits and may include one bit for a hopping flag, ten bits for a fixed size resource block assignment, four bits for a truncated modulation and coding scheme, three bits for a transmit/transmission power control (TPC) command for a scheduled physical uplink shared channel (PUSCH), one bit for a UL delay, and one bit for a channel state information request.

According to certain aspects, for low cost UEs in eMTC (e.g., under TTI bundling), the RAR grant within the bundled RAR message may be 12 bits and may include two bits for a transport block size (TBS) indicator, four bits for a UL resource block assignment indicator, three bits for a bundling length and subband hopping indicator, and three bits for a TPC mode indicator and TPC commands. In some cases, the TBS indicator may indicate a quadrature phase shift keying (QPSK) modulation and coding scheme (MCS). In some cases, the UL resource block assignment indicator may be used to indicate a particular resource allocation within a subband of six resource blocks (e.g., a narrowband region). In some cases, the bundling length and subband hopping indicator may indicate a particular bundling length and subband hopping sequence for a given bundling length. For example, for a given bundling length of 32, the bundling length and subband hopping indicator may indicate that there should be eight blocks of messages, with each block of messages hopped in four different subbands. In some cases, the TPC mode indicator may indicate whether the low cost UE should operate in one or more transmit power modes. For example, the TPC mode indicator may indicate that the low cost UE should operate in maximum power mode or some other power mode. Alternatively, one or more TPC commands may be used within the RAR grant to indicate which power the low cost UE should transmit with.

As mentioned above, after the eNB 110 transmits, at 804, a bundled RAR message to the UE 120, the UE 120 may use the various information (e.g., provided in the RAR grant defined above) in the bundled RAR message to transmit, at 806, a bundled radio resource control (RRC) connection request message (e.g., MTC_MSG 3) to the eNB 110. Put differently, the RAR message may provide a grant for transmitting a connection request message, and the grant may indicate information for a TBS, bundling length, subband hopping indicator, TPC, etc., for the connection request message. In some cases, as described above, the particular narrowband regions and/or bundling size of the bundled RRC connection request message may be indicated by the received bundled RAR message.

In addition, certain aspects presented herein may allow for the transmission timing of the bundled RRC connection request message to vary (e.g., as opposed to legacy random access procedures). For example, in general, for legacy random access procedures, the transmission timing for the transmission of the connection request message is controlled by the reception timing of the grant in the RAR message. However, in eMTC, due to bundling and/or narrowband operation, the transmission timing of the bundled RRC connection request message may have to adapt depending on the amount of bundling used for the bundled RAR and bundled connection request messages.

Accordingly, techniques presented herein may allow for the timing of transmitting the connection request message to be based at least in part on a bundling size of the bundled RAR message and/or bundling size of the connection request message. For example, the UE 120, upon decoding of the RAR grant in the bundled RAR message in a particular subframe k, may start the transmission of the bundled connection request message on a first uplink subframe k+n, n>n1, where n1 includes the time for the UE 120 to prepare a new UL packet and/or perform possible narrowband re-tuning.

In addition, in some cases, the amount of bundling used for the bundled connection request message may depend on the narrowband region that the UE 120 is operating in and/or the time needed to re-tune to another narrowband region. For example, as mentioned above, in some cases, the bundled connection request transmission may start in particular subframes and the bundling amount may depend on the number of available subframes remaining in the narrowband region that may be used for an uplink transmission.

After the UE 120 transmits, at 806, a bundled connection request message to the eNB 110, the UE 120 may expect to receive a bundled contention resolution message (e.g., MTC_MSG 4) from the eNB 110. As mentioned above, in some cases, the narrowband region and/or bundling size used for the bundled contention resolution message may be determined based at least in part on the indication in the bundled RAR message received from the eNB 110. In some cases, however, if the narrowband region and/or bundling size for the bundled contention resolution message was not indicated in the bundled RAR message, the bundled contention resolution message may be transmitted in the same narrowband region that the bundled RAR message was transmitted in and/or use the same bundling size that was used by the bundled RAR message.

Although the techniques described herein may be used for random access procedures in MTC and eMTC, those of ordinary skill in the art will appreciate that the techniques presented herein may also be applied to other procedures in MTC and/or eMTC, such as paging, transmission/reception of system information, etc.

Example Broadcast Transmission Prioritization for eMTC

Aspects presented herein may also provide techniques for prioritizing broadcast transmissions in MTC and/or eMTC.

As mentioned above, in some cases, the low cost UE may not be able to receive more than a single broadcast TB at any given time. For example, for each subframe, the low cost UE may only be able be able to receive either a RAR message, paging message, or broadcast signaling, etc., at a time. Further, although different broadcast transmissions may occur in different narrowband regions, the BS may be able to simultaneously broadcast transmissions for each of the narrowband regions at the same time. Therefore, in some cases, there may be times where the low cost UE is expecting a particular broadcast transmission from the BS but the BS may not be transmitting the particular broadcast transmission.

Accordingly, the techniques herein provide priority rules for devices in eMTC to follow when transmitting/receiving a broadcast transmission.

In certain aspects, the low cost UE may apply one or more priority rules when determining a type of message (e.g., broadcast transmission) to acquire from the BS. For example, the broadcast transmission (from the BS) may be a (bundled) random access response, a (bundled) paging message, a broadcast message carrying system information from the BS, etc. In some cases, the low cost UE may apply the priority rule(s) after transmitting a RACH message to the BS.

In one particular implementation, the low cost UE may define the reception of the bundled RAR message (e.g., since the RAR message may be triggered by a transmitted RACH) as a first priority, the reception of the paging message (e.g., which may be used for incoming data notification and update of system information) as second priority, and the reception of the system information (e.g., which, in general, may not need to be received frequently and may also be indicated via paging) as a third priority.

Thus, in the above example, if the low cost UE has transmitted a bundled RACH message and has not yet received a bundled RAR message from the BS, the low cost UE may determine to monitor for the broadcasted bundled RAR message before monitoring for a paging message and system information. If, however, the low cost UE has either not transmitted a bundled RACH message or has received a RAR message, the low cost UE may determine to monitor for a broadcasted paging message before monitoring for broadcasted system information, etc.

In general, however, although the above example describes a particular priority order for acquiring broadcast transmissions from the BS in eMTC, those of ordinary skill in the art will recognize that other priorities may also be defined for broadcast transmissions in MTC and/or eMTC.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. One or more processors, circuits, or other devices may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The means may include various hardware and/or software component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for receiving and/or means for monitoring may include a receiver, such as receive processor 238, MIMO detector 236, demodulator(s) 232*a*-232*t*, and/or antenna(s) 234*a*-234*t* of the base station 110 illustrated in FIG. 2 and/or MIMO detector 256, receive processor 258, demodulator(s) 254*a*-254*r*, and/or antenna(s) 252*a*-252*r* of the user equipment 120 illustrated in FIG. 2. Means for determining, means monitoring, means for applying, means for decoding, means for indicating, means for selecting, means for increasing, and/or means for performing, may include one or more processors (or a processing system), such as controller/processor 240, scheduler 246, transmitter processor 220, receive processor 238, MIMO detector 236, TX MIMO processor 230, and/or modulator(s)/demodulator(s) 232*a*-232*t* of the base station 110 illustrated in FIG. 2, and/or controller/processor 280, receive processor 258, transmit processor 264, MIMO detector 256, TX MIMO processor 266, and/or modulator(s)/demodulator(s) 254*a*-254*r* of the user equipment 120 illustrated in FIG. 2. Means for signaling, means for providing, means for transmitting, means for increasing, and/or means for indicating may include a transmitter, such as transmit processor 220, TX MIMO processor 230, modulator(s) 232*a*-232*t*, and/or antenna(s) 234*a*-234*t* of the base station 110 illustrated in FIG. 2, and/or transmit processor 264, TX MIMO processor 266, modulator(s) 254*a*-254*r*, and/or antenna(s) 252*a*-252*r* of the user equipment 120 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as hardware, software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   selecting a narrowband resource for a random access channel (RACH) preamble from a set of narrowband resources for RACH preambles;
   transmitting a physical RACH (PRACH) message comprising the RACH preamble;
   determining random access response (RAR) resources on which to receive a control portion of a narrowband RAR message, wherein the RAR resources comprise a narrowband located based at least in part on the RACH preamble and a starting subframe based at least in part on a level of coverage enhancement, the narrowband RAR message comprises a grant based at least in part on the level of coverage enhancement, and the grant provides a narrowband indication for one or more subsequent messages; and
   receiving the RAR message on the RAR resources.

2. The method of claim 1, further comprising:
   identifying one or more control channel decoding candidates based at least in part on the narrowband resource for the RACH preamble; and
   blindly decoding the one or more control channel candidates.

3. The method of claim 2, wherein identifying the one or more control channel decoding candidates comprises determining at least one of an aggregation level, a RAR message bundling size, or a RAR message packet size.

4. The method of claim 3, wherein the aggregation level comprises an enhanced control channel element (ECCE).

5. The method of claim 3, wherein the RAR message packet size is based at least in part on the narrowband resource for the RACH preamble.

6. The method of claim 1, wherein the narrowband resource for the RACH preamble is selected based at least in part on a bundling size of the RAR message.

7. The method of claim 1, wherein the RAR resources further comprise at least one of a starting transmission time, or a RAR message bundling size.

8. The method of claim 7, wherein the RAR message bundling size is independent of a PRACH message bundling size.

9. A method of wireless communication, comprising:
   receiving a physical random access channel (PRACH) message comprising a RACH preamble; and
   selecting random access response (RAR) resources on which to transmit a control portion of a narrowband RAR message, wherein the RAR resources comprise a narrowband located based at least in part on the RACH preamble and a starting subframe based at least in part on a level of coverage enhancement, the narrowband RAR message comprises a grant based at least in part on the level of coverage enhancement, and the grant provides a narrowband indication for one or more subsequent messages.

10. The method of claim 9, further comprising determining a bundling size for the RAR message based at least in part on the narrowband resource for the RACH preamble.

11. An apparatus for wireless communication, comprising:
   means for selecting a narrowband resource for a random access channel (RACH) preamble from a set of narrowband resources for RACH preambles;
   means for transmitting a physical RACH (PRACH) message comprising the RACH preamble;
   means for determining random access response (RAR) resources on which to receive a control portion of a narrowband RAR message, wherein the RAR resources comprise a narrowband located based at least in part on the RACH preamble and a starting subframe based at least in part on a level of coverage enhancement, the narrowband RAR message comprises a grant based at least in part on the level of coverage enhancement, and the grant provides a narrowband indication for one or more subsequent messages; and
   means for receiving the RAR message on the RAR resources.

12. The apparatus of claim 11, further comprising:
   means for identifying one or more control channel decoding candidates based at least in part on the narrowband resource for the RACH preamble; and
   means for blindly decoding the one or more control channel candidates.

13. The apparatus of claim 12, wherein the means for identifying the one or more control channel decoding candidates comprises means for determining at least one of an aggregation level, a RAR message bundling size, or a RAR message packet size.

14. The apparatus of claim 13, wherein the aggregation level comprises an enhanced control channel element (ECCE).

15. The apparatus of claim 13, wherein the RAR message packet size is based at least in part on the narrowband resource for the RACH preamble.

16. The apparatus of claim 11, wherein the narrowband resource for the RACH preamble is selected based at least in part on a bundling size of the RAR message.

17. The apparatus of claim 11, wherein the RAR resources further comprise at least one of a starting transmission time, or a RAR message bundling size.

18. The apparatus of claim 17, wherein the RAR message bundling size is independent of a PRACH message bundling size.

19. An apparatus for wireless communication, comprising:
   means for receiving a physical random access channel (PRACH) message comprising a RACH preamble; and
   means for selecting random access response (RAR) resources on which to transmit a control portion of a narrowband RAR message, wherein the RAR resources comprise a narrowband located based at least in part on the RACH preamble and a starting subframe based at least in part on a level of coverage enhancement, the narrowband RAR message comprises a grant based at least in part on the level of coverage enhancement, and the grant provides a narrowband indication for one or more subsequent messages.

20. The apparatus of claim 19, further comprising means for determining a bundling size for the RAR message based at least in part on the narrowband resource for the RACH preamble.

21. An apparatus for wireless communication, comprising:
   at least one processor; and
   memory coupled to the at least one processor, the memory storing code for the at least one processor to cause the apparatus to:
      select a narrowband resource for a random access channel (RACH) preamble from a set of narrowband resources for RACH preambles;
      transmit, via a transmitter, a physical RACH (PRACH) message comprising the RACH preamble;
      determine random access response (RAR) resources on which to receive a control portion of a narrowband RAR message, wherein the RAR resources comprise a narrowband located based at least in part on the RACH preamble and a starting subframe based at least in part on a level of coverage enhancement, the narrowband RAR message comprises a grant based at least in part on the level of coverage enhancement, and the grant provides a narrowband indication for one or more subsequent messages; and
      receive, via a receiver, the RAR message on the RAR resources.

22. The apparatus of claim 21, the memory further storing code executable by the at least one processor to cause the apparatus to:
   identify one or more control channel decoding candidates based at least in part on the narrowband resource for the RACH preamble; and
   blindly decode the one or more control channel candidates.

23. The apparatus of claim 22, the memory further storing code executable by the at least one processor to cause the apparatus to: determine at least one of an aggregation level, a RAR message bundling size, or a RAR message packet size.

24. The apparatus of claim 23, wherein the aggregation level comprises an enhanced control channel element (ECCE).

25. The apparatus of claim 23, wherein the RAR message packet size is based at least in part on the RACH preamble.

26. The apparatus of claim 21, wherein the narrowband resource for the RACH preamble is selected based at least in part on a bundling size of the RAR message.

27. The apparatus of claim 21, wherein the RAR resources further comprise at least one of a starting transmission time, or a RAR message bundling size.

28. The apparatus of claim 27, wherein the RAR message bundling size is independent of a PRACH message bundling size.

29. An apparatus for wireless communication, comprising:
   a receiver configured to receive a physical random access channel (PRACH) message comprising a RACH preamble;
   at least one processor; and
   memory coupled to the at least one processor, the memory storing code for the at least one processor to cause the apparatus to: select random access response (RAR) resources on which to transmit a control portion of a narrowband RAR message, wherein the RAR resources comprise a narrowband located based at least in part on the RACH preamble and a starting subframe based at least in part on a level of coverage enhancement, the narrowband RAR message comprises a grant based at least in part on the level of coverage enhancement, and the grant provides a narrowband indication for one or more subsequent messages.

30. The apparatus of claim 29, the memory further storing code executable by the at least one processor to cause the apparatus to determine a bundling size for the RAR message based at least in part on the RACH preamble.

31. A non-transitory computer-readable medium having processor executable code stored thereon, the processor executable code comprising:
    code for selecting a narrowband resource for a random access channel (RACH) preamble from a set of narrowband resources for RACH preambles;
    code for transmitting a physical RACH (PRACH) message comprising the RACH preamble;
    code for determining random access response (RAR) resources on which to receive a control portion of a narrowband RAR message, wherein the RAR resources comprise a narrowband located based at least in part on the RACH preamble and a starting subframe based at least in part on a level of coverage enhancement, the narrowband RAR message comprises a grant based at least in part on the level of coverage enhancement, and the grant provides a narrowband indication for one or more subsequent messages; and
    code for receiving the RAR message on the RAR resources.

32. The non-transitory computer-readable medium of claim 31, wherein the processor executable code further comprises:
    code for identifying one or more control channel decoding candidates based at least in part on the narrowband resource for the RACH preamble; and
    code for blindly decoding the one or more control channel candidates.

33. The non-transitory computer-readable medium of claim 32, wherein the code for identifying the one or more control channel decoding candidates comprises code for determining at least one of an aggregation level, a RAR message bundling size, or a RAR message packet size.

34. The non-transitory computer-readable medium of claim 33, wherein the aggregation level comprises an enhanced control channel element (ECCE).

35. The non-transitory computer-readable medium of claim 33, wherein the RAR message packet size is based at least in part on the RACH preamble.

36. The non-transitory computer-readable medium of claim 31, wherein the narrowband resource for the RACH preamble is selected based at least in part on a bundling size of the RAR message.

37. The non-transitory computer-readable medium of claim 31, wherein the RAR resources further comprise at least one of a starting transmission time, or a RAR message bundling size.

38. The non-transitory computer-readable medium of claim 37, wherein the RAR message bundling size is independent of a PRACH message bundling size.

39. A non-transitory computer-readable medium having processor executable code stored thereon, the processor executable code comprising:
    code for receiving a physical random access channel (PRACH) message comprising a RACH preamble; and
    code for selecting random access response (RAR) resources on which to transmit a control portion of a narrowband RAR message, wherein the RAR resources comprise a narrowband located based at least in part on the RACH preamble and a starting subframe based at least in part on a level of coverage enhancement, the narrowband RAR message comprises a grant based at least in part on the level of coverage enhancement, and the grant provides a narrowband indication for one or more subsequent messages.

40. The non-transitory computer-readable medium of claim 39, wherein the processor executable code further comprises code for determining a bundling size for the RAR message based at least in part on the narrowband resource for the RACH preamble.

* * * * *